United States Patent [19]

Vedova et al.

[11] 3,989,193
[45] Nov. 2, 1976

[54] DEVICE FOR VARYING THE GAS EXIT AREA OF AN EXHAUST NOZZLE FOR A JET DEFLECTING DEVICE

[75] Inventors: Ralph Vedova, Munich; Alfred Jabs, Groebenzell, both of Germany

[73] Assignee: Motoren- und Turbinen-Union Munchen GmbH M.A.N. Maybach Mercedes-Benz, Munich, Germany

[22] Filed: Feb. 24, 1975

[21] Appl. No.: 552,321

[30] Foreign Application Priority Data
Mar. 2, 1974 Germany............................ 2410069

[52] U.S. Cl......................... 239/265.35; 239/265.39
[51] Int. Cl.².................... B64C 15/04; B64C 15/06
[58] Field of Search...................... 60/232, 271, 230; 239/265.35, 265.39; 285/276

[56] References Cited
UNITED STATES PATENTS

| | | | |
|---|---|---|---|
| 2,260,038 | 10/1941 | Lang................................ | 285/276 X |
| 2,632,660 | 3/1953 | Krauthamer..................... | 285/276 X |
| 2,836,034 | 5/1958 | Geary et al. .................... | 239/265.39 |
| 3,319,892 | 5/1967 | Zirin ............................... | 239/265.35 |
| 3,776,467 | 12/1973 | Riemerschmid ................. | 60/232 X |
| 3,786,992 | 1/1974 | Robinson........................ | 239/265.39 |

*Primary Examiner*—Carlton R. Croyle
*Assistant Examiner*—Thomas I. Ross
*Attorney, Agent, or Firm*—W. G. Fasse; W. W. Roberts

[57] ABSTRACT

A jet deflecting device has a first rotatable pipe section connected to the end of an engine jet pipe and a second pipe section rotatably connected to the end of the first pipe section. Nozzle flaps are provided at the end of the second pipe section, and coupled to be moved inwardly and outwardly in response to axial movement of a nozzle actuating skirt slidably mounted at the end of the second pipe section. A first drive motor on the stationary jet pipe directly rotates the first pipe section by way of driving gears. A second drive motor is coupled by means of gears to rotate the second pipe section independently of rotation of the first pipe section. Actuating devices mounted on the engine jet pipe and providing a linear movement are coupled by way of actuating arms extending externally of the pipe sections to the nozzle actuated skirt for control of the nozzle flaps.

9 Claims, 4 Drawing Figures

DEVICE FOR VARYING THE GAS EXIT AREA OF AN EXHAUST NOZZLE FOR A JET DEFLECTING DEVICE

BACKGROUND OF THE INVENTION

This invention relates to jet deflecting devices particularly adaptable for controlling the flow direction of exhaust gases from a jet engine, and is particularly directed to a device for varying the gas exit area of the exhaust nozzle at the end of the rearmost pipe section of the jet deflecting device, wherein the jet deflecting is of the type having at least two rotatably interconnected pipe sections at the downstream end of a stationary engine jet pipe.

German Offenlegungsschrift No. 2,056,088 and U.S. Pat. No. 3,776,467 disclose jet deflecting devices of the type having at least two rotatably interconnected pipe sections at the downstream end of a stationary engine jet pipe for a jet engine. Such jet deflection devices are provided in order to deflect the exhaust gas jet of an aircraft jet engine from a horizontal direction to a direction having vertical components of efflux in order to selectively provide for horizontal or vertical flight of the aircraft.

Arrangements of this type include means providing jet deflection positions for short take-off, wherein the exhaust gas jet issues diagonally downwardly at an angle of 30° to 45° with respect to the longitudinal center line of the aircraft.

In the actuating mechanisms disclosed in the above references, the jet deflecting devices may be controlled for movement in horizontal, as well as vertical direction, whereby aircraft incorporating such mechanisms may rapidly achieve maneuvers such as changes in pitch or roll attitude which are achieved by rudder or elevator control in conventional aircraft.

In the arrangements of the above references, the rearmost rotatable pipe section of the jet deflecting devices are provided with variable nozzles in order to control the gas exit area to suit the mass flow in after burning operations and to decrease the mass flow when the after-burner is inoperative.

Known jet deflecting devices of the type having rotatably interconnected pipe sections have not been provided with suitable arrangements for the nozzle actuating mechanism, and have not provided a variable nozzle that may be actuated from a point on the stationary engine jet pipe. Any suitable design of the nozzle actuating mechanism must necessarily consider the individual movements of the pipe sections through equal or different angles of rotation. In other words, the entire exhaust gas jet system should be variable angularly not only in a vertical plane, but also in a horizontal plane to achieve three-dimensional actuation, by focusing the nozzle on any point within the confines of the cone determined by the number of rotatably mounted pipe sections, and the relative inclinations of the inlet and outlet areas of the pipe sections.

OBJECTS OF THE INVENTION

In view of the above, it is the aim of the invention to achieve the following objects singly or in combination:

to provide a nozzle actuating mechanism for a jet deflecting device of the above type, wherein the nozzle control is substantially independent of individual movements of the pipe sections; and to provide a nozzle actuating mechanism for a jet deflecting device of the type having rotatably interconnected sections, wherein the nozzle actuating mechanism satisfies the technical requirements discussed above; is simple in design and low in weight and adds as little as possible to the space required by the jet deflecting device in, for example, an aircraft tail or within an engine nacelle.

SUMMARY OF THE INVENTION

Briefly stated, the invention is directed to the provision of a nozzle actuating arrangement for use with a jet deflecting device of the type having a plurality of pipe sections rotatably coupled to the downstream end of an engine jet pipe. In accordance with the invention, a plurality of actuating arms are arranged for sliding movement in the direction of the longitudinal center line of the engine jet pipe on the outer circumference of the engine jet pipe. In addition, a plurality of actuating arms are arranged for sliding movement in the direction of the longitudinal center line of at least one of the pipe sections, said additional actuating arms being provided at the outer circumference of the respective pipe section and being adapted to rotate with the respective pipe section. The actuating levers of the stationary engine jet pipe and at least one of the pipe sections are intercoupled for transmitting longitudinal movement from actuating devices mounted externally on the engine jet pipe to a nozzle actuating skirt slidably mounted at the downstream end of the pipe section most remote from the stationary engine jet pipe. The intercoupling between the actuating arms on the pipe and the actuating arms on the pipe section, and/or between pipe sections, comprises a ring surrounding the respective pipe section and having a U-shaped cross section, the ring extending coaxially to the center line of the respective pipe or bearing between pipe sections. The ring is affixed to the actuating arms of one of the pipe sections or pipe, and guide rollers secured to the respective ends of the other actuating arms extend to joints or bearings engaging the channel formed by the U-shaped cross section of the ring.

In accordance with a further embodiment of the invention, wherein a first pipe section is rotatably coupled to the downstream end of the stationary engine jet pipe, and a second pipe section is rotatably coupled to the downstream end of the first pipe section, the guide rollers engaging the channel of a ring at the junction between the first and second pipe sections, are supported by a support ring which extends coaxially to the bearing between the first and second pipe sections. This support ring is coupled by way of push or pull rods to an axially slidable nozzle actuating skirt at the downstream end of the second pipe section for controling the movement of flaps pivotally mounted at the downstream end of the second pipe section.

In a still further embodiment of the invention, rollers are provided on the rotatable pipe sections for enabling slidable movement of the actuating arms with respect to the pipe section.

In addition, in another embodiment of the invention, interference of the nozzle actuation means with means for rotation of the pipes is prevented by extending the downstream ends of the actuating arms, and the rings having U-shaped cross sections, at a distance radially spaced from and across the actuating gears arranged in the area of the bearings between the pipe sections.

In still another aspect of the invention, hydraulically or pneumatically operated jacks may be employed to vary the nozzle exit area, such jacks being mounted at the stationary engine jet pipe. Alternatively, the actuating devices may be comprised of air, hydraulic or electric motors coupled to the actuating arms at the stationary engine jet pipe, for example, by way of step down gears, threaded spindles coupled to the step down gears, and threaded nuts coupled to the threaded spindles for transmitting longitudinal movement to the respective actuating arms.

In still another embodiment of the invention, wherein a support ring is provided at the bearing between the first and second pipe sections, pull or push rods may be hinged to the support ring, with guide elements or rollers being provided on the second rotatable pipe section for guiding the downstream ends of the pull or push rods.

BRIEF FIGURE DESCRIPTION

In order that the invention may be more clearly understood, it will now be described, by way of example, with reference to the accompanying drawings, wherein.

DETAILED DESCRIPTION OF EXAMPLE EMBODIMENTS

Figures 1, 3, 4:
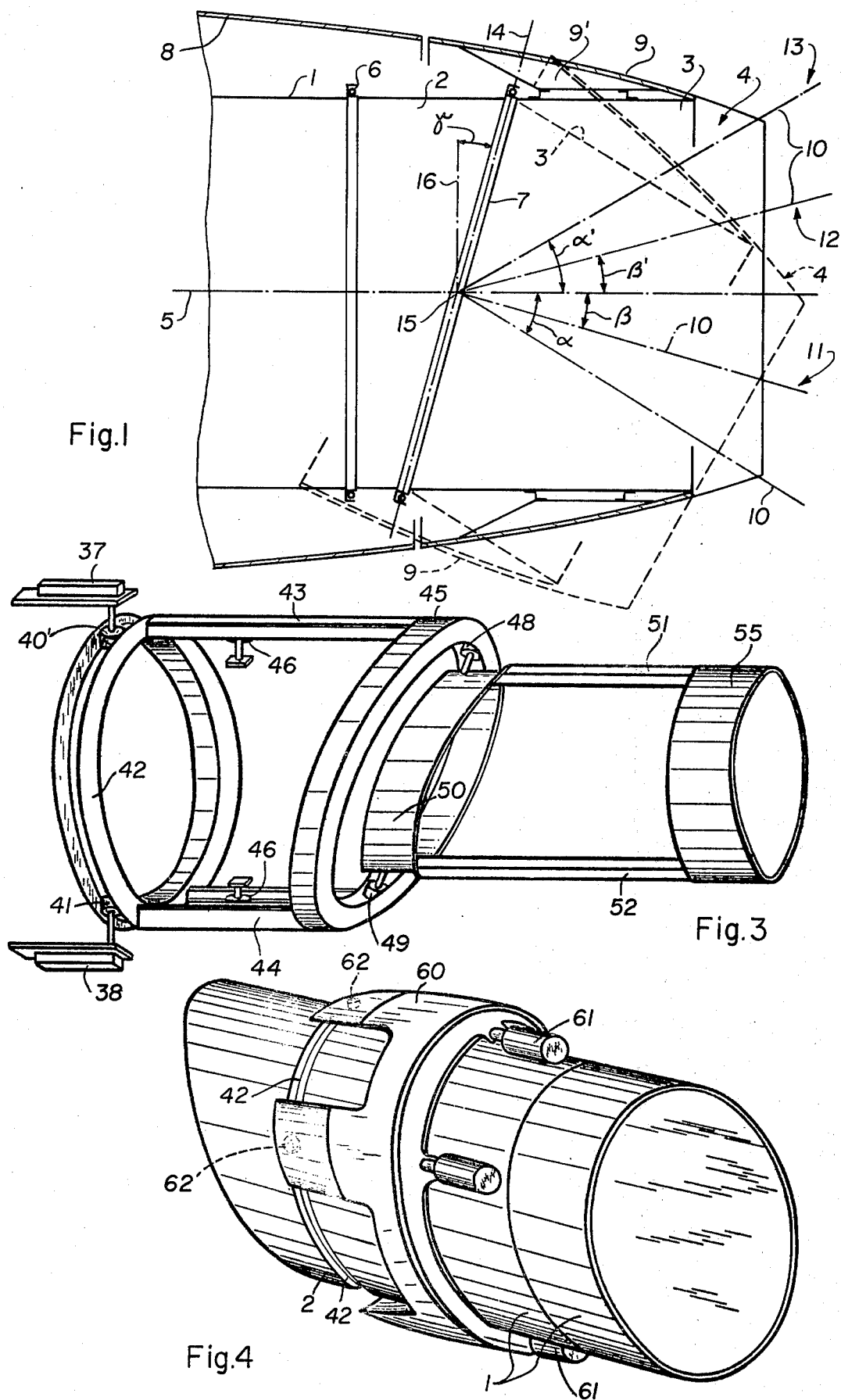
FIG. 1 is a simplified side view of a jet deflecting device which may incorporate the present invention, the figure illustrating a first jet position in solid lines and a second jet position in dashed lines.
FIG. 3 is a simplified perspective sketch of a portion of the nozzle actuating means shown in FIG. 2
FIG. 4 is a simplified perspective sketch of a portion of a modification of the actuating means of FIG. 2, in which the actuating arms form part of a unitary structure, in accordance with another embodiment of the invention.

FIG. 1 illustrates in simplified form a jet deflection device for a turbo-jet engine (not shown). The device comprises an engine jet pipe 1 adapted to be coupled with its upstream end to a turbo-jet engine. By "upstream" is meant the left-hand side of the figure. The downstream end of the jet pipe is rotatably coupled to a pipe section 2 by means of a bearing 6. The downstream end of the jet pipe 1 is in a plane extending normal to the center line 5 of the engine and jet pipe 1, and the bearing 6, which may be of conventional nature, joins the adjacent ends of the pipe 1 and the pipe section 2, whereby the pipe section 2 is rotatable about the engine center line 5. The bearing 6 is preferably a sealed bearing to prevent the escape of gases therethrough. The upstream end of the pipe section 2 is thus also in a plane normal to the engine center line 5. The downstream end of the pipe section 2 is in a plane which is at an angle to the center line 5. In the solid line view of the pipe section illustrated in FIG. 1, the downstream end of the pipe section 2 appears arcuate, since in this view the plane of the downstream end in the side view, for directing engine gases straight in the downstream direction, is rotated about a vertical line normal to the center line 5, and thus is not normal to the center line 5. When the pipe sections 2 and 3 are rotated 90° in opposite directions about the center line 5, as illustrated by the dashed lines, it is apparent that the transverse plane of the downstream end of the section 2 is at an angle $\gamma$ to the center line 5.

A further pipe section 3 is rotatably interconnected with the downstream end of the pipe section 2, by means of a bearing 7. The bearing 7 is similar to the bearing 6, as above described. The transverse plane of the upstream end of the pipe section 3, rotatably coupled to the pipe section 2, is in a plane at an angle $\gamma$ to the axis of this pipe section and in the position of the pipe section 3 illustrated in FIG. 1, it is apparent that the axis of the pipe section 3 is in line with the engine center line 5.

An engine fairing 8 is fixedly coaxially mounted with respect to the pipe 1, the fairing 8 forming part of the tail or the wing of an aircraft in which the jet engine is mounted. The fairing 8 extends downstream of the pipe 1, so that it surrounds a portion of the pipe section 2, whereby a space is provided between the fairing 8 and the outer surfaces of the pipe 1 and the pipe section 2. The fairing 8 is tapered, and the taper of this fairing is continued in a further separate fairing 9 connected to the pipe section 3 by means of suitable conventional fastening elements 9'. In the solid line positions of the pipe section 3 and the nozzle 4 illustrated in FIG. 1, which is the commonly employed end position of the sections for cruising or high speed flight, the fairing 9 thus forms a flow promoting continuation of the engine fairing 8. When the pipe section 3 and the nozzle 4 are moved to an end position shown in dashed lines in the figure, for a diagonally downward direction of exhaust of the engine gas, the fairing 9 affixed to the pipe section 3 is separated from the fairing 8 at the upper portion thereof, and the lower portion of the fairing 9 shifts into the free space between the interior wall of the engine fairing and the jet pipe 1 and pipe section 2.

The pipe sections 2 and 3 are adapted to be separately rotated, as will be explained in greater detail in the following paragraph, so that the axis of the pipe section 3 rotates in a vertical plane, thereby enabling the direction of the exhaust gases from the jet engine at desired upward or downward angles, or straight to the rear as illustrated in FIG. 1 in solid lines. In the dashed line position of the pipe section 3 illustrated in FIG. 1, the axis 10 of this pipe section is directed downwardly at an angle $\alpha$. This position corresponds to the maximum displacement of the axis of the pipe section 3 in the downward direction, and is achieved by rotation of the pipe section 2 90° in one direction and the rotation of the pipe section 3 90° in the opposite direction. FIG. 1 further illustrates an axis 13 at an angle $\alpha'$ to the center line 5, which corresponds to the maximum displacement of the axis of the pipe section 3 in the upward direction. In addition, the axis positions 11 and 12 are shown, at angles $\beta$ and $\beta'$ respectively, with respect to the center line 5, these angles corresponding to intermediate positions of the axis of the pipe section 3. The angles of inclination $\alpha$, $\alpha'$, $\beta$ and $\beta'$ of the center line 10 of the pipe section 3 lie in the plane of the drawing, and the displacement of the pipe section 3 to these angular positions is effected by the simultaneous rotation of the pipe sections 2 and 3 in opposite directions through the same angle, whereby the pipe section 3 and the nozzle 4, and the exhaust gas issuing from the latter, are rotated in a vertical plane extending through the engine center line 5, i.e., about a horizontal axis.

The maximum practicable jet deflection angles $\alpha$ or $\alpha'$ between the engine center line 5 and the common center line 10 of the pipe section 3 and the nozzle 4 depend, among other facts, upon the selected angle of inclination γ between the inclined plane 14 of the bearing 7 and a plane 16 normal to the center line 5 and extending through the center 15 of the bearing 7 and the engine center line 5, whereby the angle γ is equal to α/2. The plane 14, in FIG. 1, is illustrated with respect to the position of the plane as rotated with the pipe section 3 to the dashed line position.

Assuming that an angle of inclination of γ of 15° is provided, the angle α of maximum displacement is thus 30° with respect to the center line 5, and similarly, if an angle of inclination of γ = 45° is provided, the angle α of maximum displacement is equal to 90°. The maximum displacement position of the axis 10 of the pipe section 3 is thereby obtained by rotating, preferably simultaneously the pipe sections 2 and 3 in opposite directions, each through an angle of 90°.

The present invention also provides means for swivelling the gas jet in any direction, i.e. so that the axis of the pipe section 3 may be displaced horizontally as well as vertically. This enables the arrangement to be employed in the tail of an aircraft to replace conventionally employed rudders and elevators. This assumes that the gas jet from the engine is not only rotated in the plane of the drawing of FIG. 1, but that it may be additionally swivelled out of the plane of the drawing, i.e., with respect to the engine center line 5, so that horizontal and/or vertical displacement in any desired direction may be achieved. The pipe sections 2 and 3 are rotatable with respect to one another through different angles and at different rates. An actuating device for rotating the pipe sections 2 and 3 is illustrated in FIG. 2, wherein relatively simple means are provided to rotate the pipe sections 2 and 3 separately through either the same or different angles.

Figure 2:
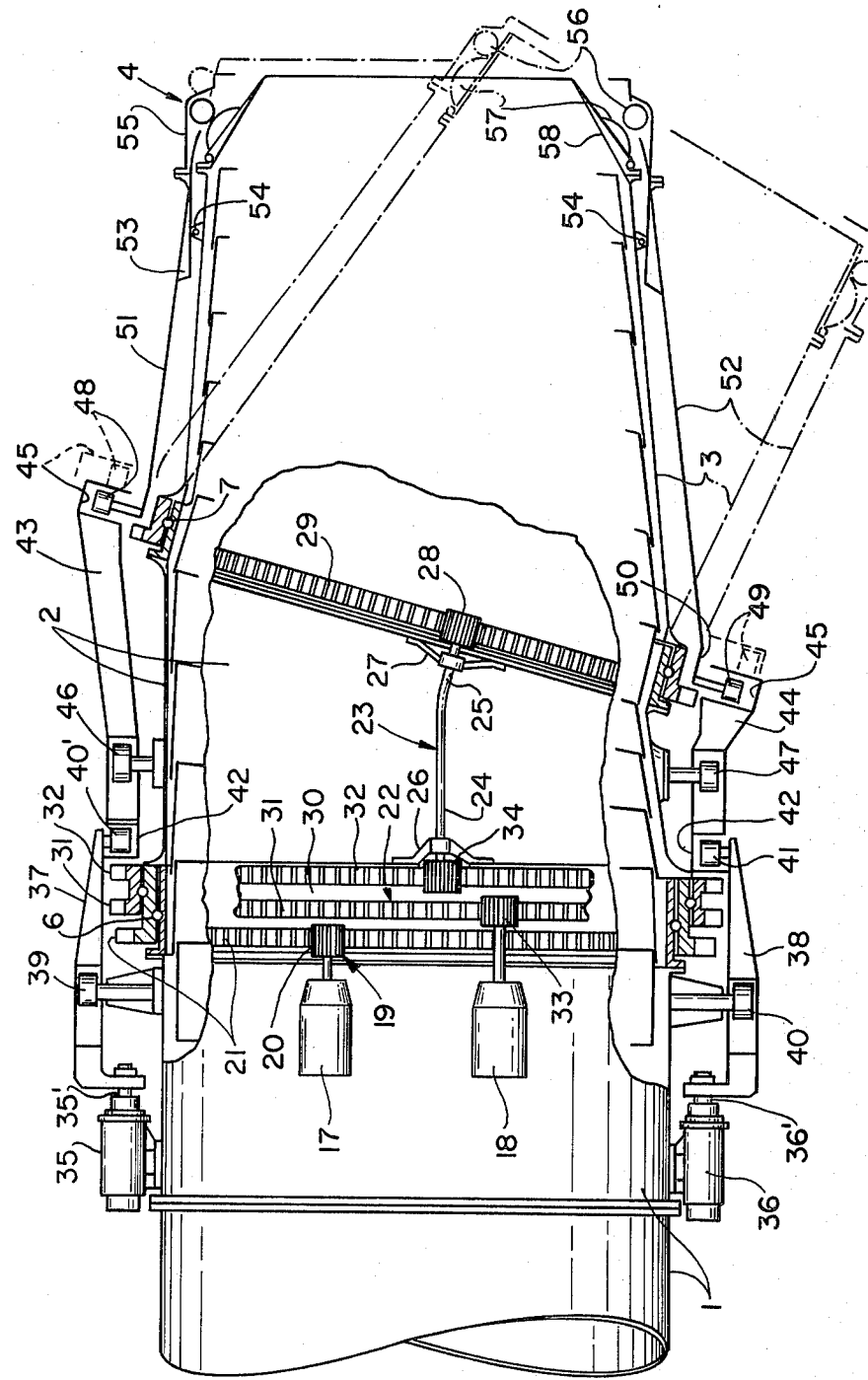
FIG. 2 is an enlarged partially broken away and partially cross-sectional view of a portion of the jet deflecting device of FIG. 1, and additionally showing the related drive means and actuating gears for pipe and nozzle actuation in accordance with the invention.

FIG. 2 illustrates the pipe sections 2 and 3 in their normal positions in solid lines and at their angular displacement wherein the axis 10 of the pipe section 3 is at the maximum angle α in the downward direction with respect to the center line 5 in dash-dotted lines. As illustrated in FIG. 2, motors 17 and 18 are mounted in fixed positions externally of the engine jet pipe 1 by suitable conventional means. These motors may be air motors, hydraulic motors, or electric motors. The motor 17 is provided with a pinion 20, which engages a ring gear 21 fixedly mounted to the upstream end of the pipe section 2 and surrounding the outer circumference of the bearing 6. Alternatively, the ring gear 21 may be fixedly mounted to surround the pipe section 2. The drive motor 18 is provided with a pinion 33, which engages a ring gear 31. The ring gear 31 is mounted on an annular ring carrier 30, which is rotatably mounted on the outer circumference of the pipe section 2, a ring gear 32 also being provided on the carrier 30 at the end thereof away from the pipe 1. A gear 34 engages the ring gear 32, the gear 34 being mounted at one end of a transfer means 23 for transferring rotary motion across the bearing 7. Thus, the transfer means 23 is rotated from the motor 18 by way of the pinion 33, ring gear 31, carrier 30, ring gear 32 and gear 34, the rotation of these elements being independent of the pipe section 2.

The transfer means 23 may comprise a flexible shaft having a first end 24 extending in parallel with the engine center line 5 and a second portion 25 with an inclination related to the inclination of the plane 14 of the bearing 7. The flexible shaft 23 is suspended and supported by shaft supports 27 and 27' which are attached by suitable means to the exterior of the pipe section 2. Alternatively, the transfer means may comprise a pair of shafts interconnected by way of a swivel joint. The angular ring gear carrier 30 forms a portion of a differential gear set 22, which also includes the ring gear 21.

The pinions 33 and 34 may conveniently have the same diameters and numbers of teeth, and similarly the ring gears 31 and 32 may also conveniently have the same diameter and numbers of teeth. Alternately, the gear ratio of the pinion 33 to ring gear 31 and of pinion 34 to ring gear 32 may be the same.

A ring gear 29 is provided affixed to the pipe section 3 adjacent its inlet end and a pinion 28 is provided on the end portion 25 of the transfer means 23, whereby the pipe section 3 may be rotated by the motor 18 independently of the rotation of the pipe section 2. The gear ratio between the gear 28 and the ring gear 29 may be selected to correspond to that of the pinions 33, 34 with respect to their ring gears 31, 32. In order to provide a circular bearing 7 at the angle of inclination γ of plane 14 of this bearing 7, as described in FIG. 1, the cross sections of the pipe sections 2 and 3 may be slightly elliptical, at least in the area of this bearing.

As a consequence of the arrangement above described with reference to FIG. 2 and the arrangement of the differential gear set 22 and transfer means 23, it is apparent that the pipe sections 2 and 3 can be rotated jointly through equal or different angles of rotation.

The pipe sections 2 and 3 can also be rotated completely independently of one another such that, when it is desired to rotate the pipe section 3 without rotation of the pipe section 2, no forced motion of the first drive motor 17 results. Similarly, when it is desired to hold pipe section 3 and rotate pipe section 2, no forced motion of the second drive motor 18 results.

In order to enable the variation of the gas exit area of the nozzle 4 from a point on the stationary engine jet pipe 1 completely independently of the rotation of the pipe sections 2 and 3, two actuating devices 35 and 36 are mounted externally with respect to the engine jet pipe 1. The actuating devices 35 and 36 are conventional devices for producing an actuating movement in the direction of the center line 5 of stationary engine jet pipe 1. For example, the actuating devices may be air, hydraulic or electric motors coupled to drive step down gears, which in turn may be coupled to threaded spindles carrying nuts (not shown), whereby the nuts perform a linear movement in the direction parallel to the center line 5 of the pipe 1. Alternatively, the actuating devices 35 and 36 may be conventional actuating jacks having hydraulically or pneumatically operated control pistons.

The movable elements 35' and 36' of the actuating devices 35 and 36 are connected to actuating arms 37 and 38 respectively, these arms extending externally at the outer circumference of the stationary engine jet pipe 1, and being adapted for sliding movement parallel to the longitudinal center line 5 of the jet pipe 1. The downstream ends of the arms 37 and 38 extend over and across the bearing 6 between the stationary engine jet pipe 1 and the first rotatable pipe section 2, as well as over the ring gears 21, 31 and 32. The arms 37 and 38 thus extend generally parallel to the center line 5.

The arms 37 and 38 are mounted so that they may be slid parallel to the center line 5 in response to movement of the actuating members 35' and 36'. For example, suitable conventional roller assemblies 39 and 40, affixed to the outer circumference of the jet pipe 1, may be provided to engage the arms 37 and 38 respectively. Rollers 40' and 41 are affixed to the downstream ends of the arms 37 and 38 respectively, these rollers having axes normal to the axis of the center line, and being generally in a common plane normal to the center line 5 between ring gear 32 and the downstream end of the pipe section 2.

A ring 42 having a U-shaped cross section is provided surrounding the pipe section 2, the open side of the U-shaped cross section extending outwardly of the pipe section. The roller 40' and 41 of the arms 37 and 38 respectively extend into the U-shaped cross section of the ring 42. This relationship may be more clearly apparent from the simplified prospective view of FIG. 3.

The upstream ends of actuating arms 43 and 44 are affixed to the ring 42, the arms 43 and 44 extending generally parallel to the center line 5 on opposite sides of the deflecting device toward the nozzle end thereof. These arms 43 and 44 extend generally to the region of the bearing 7, as illustrated in FIG. 2, and as is apparent in FIGS. 2 and 3, a second ring 45 is affixed to the downstream ends of the arms 43 and 44. The second ring 45 also has a U-shaped cross section, the open side of the U-shaped cross section extending inwardly. The second U-shaped ring 45 extends generally in the plane of the second bearing 7 and essentially coaxially with the second bearing 7 above the ring gear 29.

The actuating arms 43 and 44 are adapted only for sliding movement in the direction parallel to the center line 5, with respect to the pipe section 2. For this purpose, rollers 46 and 47 are mounted by conventional means for rotation about axes fixed with respect to the pipe section 2, these rollers engaging the arms 43 and 44 respectively whereby the arms may move longitudinally with respect to the pipe section 2, but rotate with the pipe section 2 as this pipe section rotates.

As illustrated in FIGS. 2 and 3, it is thus apparent that the arms 43 and 44 may have different lengths, dependent upon the position at the circumference of the pipe section 2 at which they extend.

A support ring 50 is arranged between the bearing 7 and the ring 45, the outer circumference of the ring 50 being provided with rollers 48 and 49 which extend outwardly into the channel formed by the U-shaped cross section of the ring 45.

Push rods 51 and 52 extending longitudinally externally of the pipe section 3 have their upstream ends connected to the ring 50. As illustrated in FIG. 2, the pull or push rods 51 or 52 are guided by means of a ring member 53 affixed to the inner surfaces thereof and surrounding the pipe section 3. The ring member 53 engages guide members or rollers 54 arranged on the outer circumference of the rotatable pipe section 3.

A nozzle actuating skirt 55 is also connected to the ring member 53, the nozzle actuating skirt hence being adapted to be moved longitudinally with the rods 51 and 52. The nozzle actuating skirt 55 carries internal rollers 56 which are mounted to engage curved guide cams 57 of nozzle flaps 58, the nozzle flaps 58 being pivotally connected to the downstream end of the pipe section 3. Alternatively, although it is not shown in the drawings, the pull or push rods 51 and 52 may be hinged at the upstream ends to the support ring 50.

The nozzle actuating skirt 55 is an annular member slidingly held at the downstream end of the pipe section 3, whereby actuation of the devices 35 and 36 effects the forward and backward movement of the nozzle actuating sleeve at the downstream end of the pipe section 3.

Referring still to FIG. 2, a plurality of the nozzle flaps 58 are pivotally connected, for example, by way of suitable interconnecting members, to the downstream end of the pipe section 3. The outer surfaces of the nozzle flaps 58 are provided with radially extending curved guide cams 57. Gas pressure prevailing inside of the pipe section 3 urges the nozzle flaps 58 outwardly, to thereby urge the guide cam 57 thereon against the rollers 56. As a consequence, it is apparent that back and forth movement of the nozzle actuating skirt 55, in response to movement of the arms 51, 52, controls the angular position of the nozzle flaps 58. Thus, as illustrated in FIG. 2, the nozzle flaps 58 are shown in solid lines in their extreme inward positions, where they extend the furthest into the stream of the exhaust gas to hence produce the smallest possible nozzle exit area. The nozzle contour shown in dash-dotted lines in FIG. 2 characterizes the largest gas exit area, produced by moving the nozzle actuating skirt in the downstream direction.

The position of the second actuating arms 43 and 44, when changed to achieve the maximum gas exit area of the nozzle 4, is illustrated by the dashed line contour of the second U-shaped ring 45 and guide rollers 48 and 49 at their downstream end, in FIG. 2.

When the pipe sections are rotated, and hence pivoted, to move the second rotatable pipe section 3 from the high speed or cruise position illustrated in solid lines in FIG. 2, to the short takeoff position shown in dash-dot lines in FIGS. 2, the pull and push rods 51 and 52 are pivoted together with the pipe section 3, with the guide rollers 48 and 49 traveling within the second U-shaped ring 45. The pull push rods 51 and 52 may thus be mounted by conventional means for sliding movement in the longitudinal direction at the outer circumference of the pipe section 3, for example, in the same manner that the arms 43 and 44 are mounted to the outside of the pipe section 2. The rods 51 and 52 thus rotate with the pipe section 3 about the center line 10 of this pipe section.

It is therefore apparent that, when the nozzle actuating device in accordance with the invention is employed, the nozzle gas exit area may be varied at any time, either simultaneously with the positioning of the jet deflection device to the desired jet deflection angle, or at times that the jet deflection device is held in a fixed position.

The actuating arms 37 and 38 may be replaced by an at least partially continuous actuating member 60 extending coaxially of the center line 5 as illustrated in FIG. 4. At its upstream end this continuous actuating member 60 may be in the form of a ring, and it may have several arms of the type of the actuating arms 37 and 38 illustrated in FIG. 2. Such arms being equally spaced about the circumference of the stationary jet pipe 1 and carrying rollers 62 adapted to extend into the U-shaped cross section of ring 42 (FIGS. 2, 3) in the same manner that rollers 40, 41 extend into the U-shaped cross section of ring 42 — line 3 after "rollers" insert — not shown— line 4 after "pipe" insert —, and suitable drive motors 61 may be provided for axially moving the member 60 with respect to jet pipe 1, similar to the motors 35, 36 of FIG. 2. In this modification, the actuating member may be arranged to travel along several rollers spaced equally about the circumference of the stationary engine jet pipe.

It is further apparent that the second actuating arms 43 and 44, illustrated in FIG. 2, may be replaced with several arms, for example four arms, of the same type, such arms being equally spaced about the outer circumference of the rotatable pipe section 2.

Similarly, the number of push or pull rods 51 and 52, of rollers 39, 40, 46 and 47, of guide rollers 40', 41, 48 and 49, and rollers 54 may be increased as desired, for example, to employ four of such elements equally spaced about the outer circumference of the jet deflection device or its associated pipe sections.

Although the invention has been described with reference to a specific example embodiment, it is to be understood, that it is intended to cover all modifications and equivalents within the scope of the appended claims.

What is claimed is:

1. In a device for varying the gas exit area of an exhaust nozzle, including stationary engine jet pipe means, a jet deflecting apparatus having intermediate pipe section means between said stationary engine jet pipe means and said exhaust nozzle, bearing means rotatably interconnecting said intermediate pipe section means to said engine jet pipe means and to said nozzle for relative rotation about an axis at an angle to the axis of the downstream end of said intermediate pipe section means, with the upstream end of said intermediate pipe section means being rotatably intercoupled to the downstream end of the stationary engine jet pipe means; said area varying device comprising first and second actuating arm means, means mounting said first and second actuating arm means for sliding movement in the direction of the respective longitudinal center line at the outer circumference of said stationary engine jet pipe means and said intermediate pipe section means respectively, said second actuating arm means being mounted to rotate with said intermediate pipe section means, means coupling said first and second actuating arm means comprising a ring having a U-shaped cross section forming a channel surrounding the upstream end of said intermediate pipe section means coaxially therewith and affixed to one of said first and second actuating arm means, and a roller on the end of the other of said first and second actuating arm means engaging said channel, driving means on said stationary engine jet pipe means coupled to longitudinally move said first actuating arm means in a direction parallel to the longitudinal center line of said stationary engine jet pipe means, a support ring arranged coaxially to said bearing means, guide rollers on said support ring, a ring having a U-shaped cross section forming a channel affixed to the downstream end of said second arm means and engaging said rollers on said support ring, an axially sliding nozzle actuating skirt at the downstream end of said rearmost pipe section means, means coupling said support ring to axially move said nozzle actuating skirt, and flap means mounted at the downstream end of said rearmost pipe section means and operatively coupled to said nozzle actuating skirt.

2. The device according to claim 1, comprising rollers on said engine jet pipe and said intermediate pipe section means for longitudinally guiding said first and second actuating arm means respectively.

3. The device according to claim 1, wherein said ring having a U-shaped cross section and affixed to the downstream end of said second actuating arm means is radially spaced from the joint between said intermediate pipe section means and said rearmost pipe section means.

4. The device according to claim 1, wherein said driving means comprises a hydraulically operated jack.

5. The device according to claim 1, wherein said driving means comprises a pneumatically operated jack.

6. The device according to claim 1, wherein said drive means comprises a rotary motor and means for translating the rotary motion of said motor to linear motion.

7. The device according to claim 1, wherein said means coupling said support means to move said nozzle actuating skirt comprises rod means, further comprising guide roller means on said rearmost pipe section means for guiding said rod means, said rod means being hinged to said support ring.

8. A device for varying the gas exit area of an exhaust nozzle affixed to the rearmost pipe section of a jet deflecting apparatus of the type having first pipe means and second pipe means interconnected to said first pipe means for rotation about an axis at an angle to the axis of said first pipe means; said device comprising first and second actuating arm means mounted for sliding movement in the direction of the respective longitudinal center line at the outer circumference of said first and second pipe means respectively, at least one of said actuating arm means being mounted for rotation with the respective pipe means, means coupling said first and second actuating arm means comprising a ring having a U-shaped cross section forming a channel surrounding the junction between said first and second pipe means and affixed to one of said first and second arm means, and a roller on the end of the other of said first and second arm means for engaging said channel, said ring extending coaxially of the respective pipe section, means for longitudinally driving said first actuating arm means, and nozzle actuation means coupled to said second actuating arm means.

9. The device according to claim 8, wherein said first actuating arm means comprise an integral acutating member extending coaxially to said longitudinal center line of said first pipe means.

* * * * *